United States Patent [19]

Groth et al.

[11] Patent Number: 4,955,825

[45] Date of Patent: Sep. 11, 1990

[54] ELECTRICAL FIXTURE

[75] Inventors: John E. Groth, Cleveland Heights; Martin F. Delmore, Seven Hills; Raymond S. Laughlin, Cuyahoga Falls, all of Ohio

[73] Assignee: Erico International Corporation, Solon, Ohio

[21] Appl. No.: 3,451

[22] Filed: Jan. 14, 1987

[51] Int. Cl.[5] .......................................... H01R 13/60
[52] U.S. Cl. .................................... 439/535; 220/3.5
[58] Field of Search ............... 339/122, 123, 131, 125; 220/3.3, 3.4, 3.5, 3.6, 3.8, 3.9, 3.92, 241, 242; 174/52, 53, 54, 55, 56, 58; 33/DIG. 10, 562, 563; 248/DIG. 6

[56] References Cited

U.S. PATENT DOCUMENTS

| | | | |
|---|---|---|---|
| 973,568 | 10/1910 | Russel | 339/131 |
| 2,586,728 | 2/1952 | Shepard | 220/3.6 |
| 2,778,869 | 1/1957 | Bentley | 174/53 |
| 3,476,343 | 11/1969 | Burrell | 220/3.6 |
| 4,561,615 | 12/1985 | Medlin, Jr. | 220/3.5 |
| 4,576,431 | 3/1986 | Thayer | 339/131 |
| 4,673,235 | 6/1987 | Conley | 220/3.6 |

*Primary Examiner*—David L. Pirlot
*Attorney, Agent, or Firm*—Renner, Otto, Boisselle & Sklar

[57] ABSTRACT

An electrical fixture for mounting a cover plate over a wall opening which eliminates the necessity of installing an outlet box within such wall opening to facilitate the mounting of the cover plate. In a preferred embodiment the fixture comprises a rectangular plate having a front and rear surface, and a major opening and a pair of screw openings extending therethrough. Extending from the longer side edges of the major opening essentially perpendicular to the front and rear surfaces are a pair of flanges which serve to provide lateral support for the fixture within the wall opening. Extending from the center of the narrower top and bottom edges of the major opening are a pair of diametrically opposed deformable fingers which, upon insertion of the fixture within a wall opening, may be bent firmly to secure the fixture within the opening. Each of the deformable fingers includes a slot of sufficient size that upon attachment of the cover plate to the fixture with fasteners the deformable fingers do not interfere with the driving or placement of such fasteners.

9 Claims, 1 Drawing Sheet

U.S. Patent    Sep. 11, 1990    4,955,825
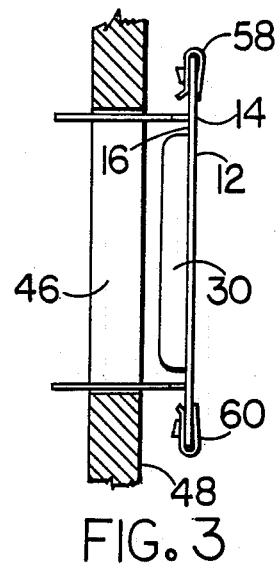
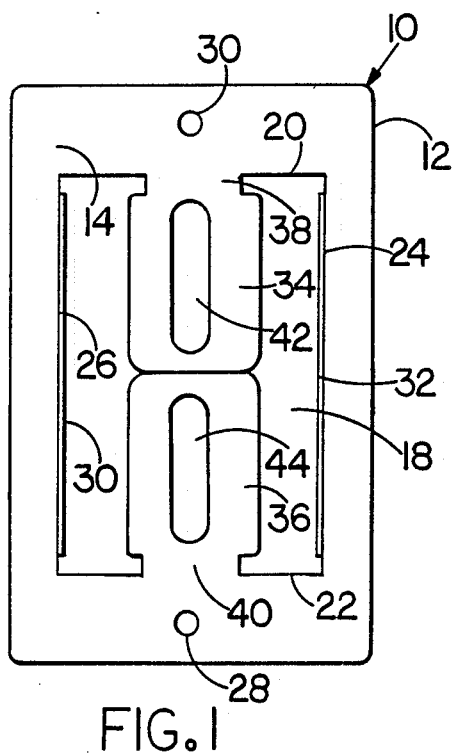
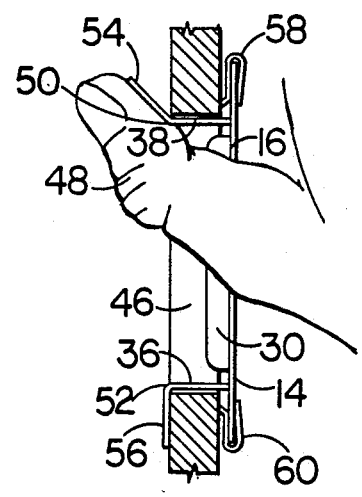

ELECTRICAL FIXTURE

The present invention relates to a fixture for securing a cover plate to a wall. More specifically, this invention relates to an electrical fixture for mounting a cover plate to a wall over a wall opening which eliminates the need for an outlet box within such wall opening to facilitate the mounting of the cover plate.

BACKGROUND

The prior art provides various means for mounting a cover plate to a wall over a wall opening. Generally, however, such means of mounting a cover plate include the use of an outlet box which must first be installed within the wall opening prior to the mounting of the cover plate. Such outlet boxes serve as mounting bases for the cover plates. Thayer U.S. Pat. No. 4,576,431 provides a fixture for securing a cover plate to a wall without the use of an outlet box. However, the Thayer fixture provides limited support for the cover plate upon the wall and may not be mounted immediately adjacent a vertical support or stud located within the wall. It also normally requires two hands to install and because of the prebent fingers is difficult to package and ship.

SUMMARY OF THE INVENTION

The present invention provides a fixture for securely mounting a cover plate to a wall over an opening which eliminates the necessity of an outlet box.

The fixture comprises a rectangular plate having a front surface, a rear surface, and a major opening and a pair of screw openings extending through the plate. The major opening is bounded by narrower top and bottom and longer side wall edges. Extending from the side edges of the major opening essentially perpendicular to the front and rear surfaces are a substantially coextensive pair of flanges. These flanges serve to provide lateral support for the fixture within the wall opening. Extending from the center of the top and bottom edges of the major opening are a pair of diametrically opposed deformable fingers. Upon insertion of the fixture within the wall opening the deformable fingers may easily be bent and wrapped around the edge of the wall opening firmly to secure the fixture therein. Provided within each of the deformable fingers is a slot of suitable size which prevents the shank of the screws from interfering with the position of the deformable fingers once they have been bent into position within the wall opening by a user.

Centrally positioned upon the plate in the proximity of the top and bottom edges of the major opening are a pair of screw openings which serve to receive the screws which secure the cover plate to the fixture. Preferably, each screw opening includes a fastener clip to ensure a more secure attachment of the cover plate to the fixture.

In addition to eliminating the requirement of an outlet box when mounting a cover plate upon a wall, a fixture made in accordance with the present invention provides various additional advantages. Specifically, such a fixture upon installation resists motion due to forces emanating from both the vertical and horizontal directions. The flanges provide resistance to horizontal forces and the deformable fingers provide resistance to vertical forces. Additionally, since the deformable fingers emanate from the top and bottom edges of the major opening, instead of the side edges of such opening, the fixture may be installed in a variety of locations within a wall including a location immediately adjacent to a vertical support or stud contained within a wall. Applicants' fixture is also easy to install. The fixture itself may serve as a template to assist in cutting the opening. The fixture may then be installed with the lower finger bent first to hook around the bottom edge of the hole. The upper finger may then be bent with the same hand. Furthermore, the unique configuration of applicant's fixture permits the nested stacking thereof facilitating packaging and handling.

To the accomplishment of the foregoing and related ends the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 1 is a front plan view of a fixture made in accordance with the present invention;

FIG. 2 is a top plan view of the fixture of FIG. 1;

FIG. 3 is a side plan view of the fixture of FIG. 1 being inserted into an opening in the outer panel of a wall; and FIG. 4 is a side plan view of the fixture of FIG. 1 illustrating the method by which the fixture is mounted within an opening in the outer panel of a wall.

DETAILED DESCRIPTION OF PREFERRED EMBODIMENT

Referring to the drawings and initially to FIGS. 1 and 2 there is illustrated an electrical fixture 10 for mounting a cover plate or the like to a wall over a wall opening. Such fixture 10 eliminates the necessity of an outlet box when affixing a cover plate to a wall. Examples of use of fixture 10 include cover plates for providing access to junctions situated within walls, cover plates having telephonic receptacles, connectors, and modules attached thereto, and cover plates serving as access guides or connectors for computer, communication or antenna wire distribution lines. Fixture 10 is also suitable for use in conjunction with walls of any one of a variety of construction including plaster, drywall, metal, plywood, paneling, and the like.

Fixture 10 comprises a rectangular plate 12 having a front surface 14, a rear surface 16, and a major opening 18. Major opening 18 is bounded by narrower top and bottom edges 20 and 22, and longer side edges 24 and 26. Located adjacent both the top edge 20 and the bottom edge 22 are a pair of screw openings 28 and 30 which facilitate the attachment of a cover plate to the fixture 10 utilizing a pair of screws or similar fasteners.

Provided along side edges 24 and 26 are coextensive flanges 30 and 32 which extend essentially perpendicular to the front 14 and rear 16 surfaces. Flanges 30 and 32 serve horizontally to align fixture 10 within a wall opening and prevent lateral movement of the fixture 10 within such opening.

Extending respectively from the center of the top edge 20 and bottom edge 22 are diametrically opposed deformable fingers 34 and 36. Deformable fingers 34 and 36 each include a reduced portion 38 and 40 connecting the finger to its respective edge. Preferably, as illustrated, deformable fingers 34 and 36 each span half the longer or vertical distance of opening 18. It will be appreciated however that deformable fingers 34 and 36 may also be formed so as to span less than half the vertical distance of opening 18, resulting in the formation of a gap between the ends of the deformable fingers 34 and 36.

Centrally located within each of the deformable fingers 34 and 36 is a screw shank slot designated 42 and 44 respectively. Slots 42 and 44 are of such size as to allow the shank of the screws which secure the cover plate to the fixture to pass therethrough after the fingers 34 and 36 are bent into position and the fixture 10 is mounted within the wall. Preferably, as illustrated, slots 42 and 44 are somewhat elongated so as to provide a wide range of clearance for the screw shanks. Thus, slots 42 and 44 will perform their function with outer wall panels having a range of thicknesses.

Referring now to FIGS. 3 and 4 the method of installing fixture 10 will be more completely appreciated. Specifically, illustrated in FIG. 3 is the fixture 10 partially inserted within an opening 46 formed in the outer panel 48 of a wall. As shown, prior to insertion deformable fingers 34 and 36 may be bent by a user to such an extent that the fingers are oriented perpendicular to the front 14 and rear 16 surfaces of the plate 12. Reduced portions 38 and 40 serve to facilitate such bending of the deformable fingers 34 and 36. In such condition the opening 18 may serve as a template for cutting the hole in the wall.

As illustrated in FIG. 4, once the fixture 10 has been seated within the opening 46 the deformable fingers 34 and 36 are further bent or wrapped about the outer panel 48 so as to firmly secure the fixture 10 thereto. Specifically, deformable fingers 34 and 36 are bent with a user's thumb 48 at points 50 and 52 such that the end portions of deformable fingers 54 and 56 are essentially parallel with the front 14 and rear 16 surfaces and in close contact with outer panel 48. The lower finger may be bent first to hook around the lower edge of the hole. While thus supported the upper finger may be bent with the same hand.

Upon completed bending of deformable fingers 34 and 36 the fixture 10 is securely seated within opening 46 and the mounting of a cover plate thereto may be undertaken. Preferably, so as to provide a secure attachment of a cover plate to the fixture 10, fixture 10 includes a pair of spring nuts or fastener clips 58 and 60 properly aligned with each of the screw openings 28 and 30. Fastener clips 58 and 60 serve to provide a more secure engagement between the fixture 10 and the screws or fasteners attaching a cover plate to the fixture 10. Upon the insertion and driving of the screws through openings 30 and 28 it will be appreciated that slots 42 and 44 in deformable fingers 34 and 36 provide sufficient clearance for the shanks of such screws if driven through the outer panel 48.

It will be appreciated that since the fingers 34 and 36 extend vertically from the top 20 and bottom 22 edges of the major opening 18, the fixture 10 may be mounted immediately adjacent a vertical support or stud contained in the wall, such stud or support not interfering with the deformation of the deformable fingers 34 and 36.

Fixture 10 may be produced utilizing various manufacturing techniques from any one of a variety of materials. Preferably, however, fixture 10 is produced from steel sheet in a combination blanking and forming press.

Such a press imparts the various openings in the fixture and forms the flanges 30 and 32 to their upstanding position.

After blanking and forming the fixtures 10 are of such configuration that they may easily be stacked and nested one inside the other, the flanges 30 and 32 deflecting as necessary to allow such nesting. The ability to stack and nest fixtures 10 facilitates the packaging thereof and in turn reduces handling costs.

Although the fixture 10 has been illustrated as being essentially rectangular in shape, it will be appreciated that a fixture made in accordance with the present invention may also be square. Also, a fixture made in accordance with the present invention may be produced in a variety of sizes so as to accommodate a variety of wall opening and cover plates. Also, the deformable fingers 34 and 36 may be produced with a variety of lengths so as to allow the fingers 34 and 36 to bend around and firmly engage outer wall panels having various thicknesses.

Although the invention has been shown and described with respect to a certain preferred embodiment, it is obvious that equivalent alterations and modifications will occur to others skilled in the art upon the reading and understanding of the specification. The present invention includes all such equivalent alterations and modifications, and is limited only by the scope of the following claims.

What is claimed is:

1. An electrical fixture for mounting a cover plate upon a wall over a wall opening located in the panel of such wall with fasteners, comprising a plate having a front surface, a rear surface, a major opening and a pair of fastener openings extending from said front surface through to said rear surface, said major opening having top, bottom and side edges, and one of said fastener openings being located adjacent said top edge and the other of said fastener openings being located adjacent said bottom edge, said side edges of said major opening each including a protruding flange which serves to align and secure said electrical fixture within such wall opening, said top and bottom edges each including a deformable finger extending essentially normal thereto in the proximity of said respective fastener opening which is adapted for insertion and deformation within such wall opening, said deformable fingers each including a slot which upon deformation of the finger around such panel and within such wall opening aligns with said respective fastener opening through a range of thicknesses of such panel such that upon insertion and driving of such fasteners within said fastener openings such fasteners are not obstructed by said deformable fingers, said major opening being rectangular and said top and bottom edges of said major opening being narrow and said side edges of said major opening being longer, each of said deformable fingers including a reduced portion connecting said deformable fingers to the respective top or bottom edge which facilitates the bending thereof.

2. An electrical fixture as set forth in claim 1 wherein said plate is rectangular.

3. An electrical fixture as set forth in claim 1 wherein said fastener openings each includes a fastener clip.

4. An electrical fixture as set forth in claim 1 wherein said deformable fingers are diametrically opposed to one another.

5. An electrical fixture as set forth in claim 4 wherein said diametrically opposed deformable fingers are positioned at the center of their respective top or bottom edge.

6. An electrical fixture as set forth in claim 5 wherein said slots in each of said deformable fingers form an elongated opening.

7. An electrical fixture as set forth in claim 6 wherein the configuration of said fixture is such as to allow the nested stacking thereof.

8. An electrical fixture as set forth in claim 6 wherein each of said deformable fingers spans approximately half the length of said side edges of said major opening.

9. An electrical fixture as set forth in claim 6 wherein said flanges are not capable of being bent around such panel.

* * * * *